(12) United States Patent
Tutmaz et al.

(10) Patent No.: US 7,487,978 B2
(45) Date of Patent: Feb. 10, 2009

(54) MEDIA CONSOLE FOR STROLLER

(76) Inventors: Omer Tutmaz, 22 Kernville, Irvine, CA (US) 92602; Sandra Tutmaz, 22 Kernville, Irvine, CA (US) 92602

( * ) Notice: Subject to any disclaimer, the term of this patent is extended or adjusted under 35 U.S.C. 154(b) by 445 days.

(21) Appl. No.: 11/200,940

(22) Filed: Aug. 9, 2005

(65) Prior Publication Data
US 2006/0150207 A1 Jul. 6, 2006

Related U.S. Application Data

(60) Provisional application No. 60/641,045, filed on Dec. 30, 2004.

(51) Int. Cl.
*B62B 9/00* (2006.01)
(52) U.S. Cl. ............... 280/47.38; 280/642; 280/647; 280/650; 280/657; 280/658; 280/47.25; 224/409
(58) Field of Classification Search ............ 280/642, 280/647, 650, 657, 658, 47.25, 47.38; 224/409, 224/42.32, 42.33; 312/223.2, 223.3
See application file for complete search history.

(56) References Cited

U.S. PATENT DOCUMENTS

| | | | | |
|---|---|---|---|---|
| 5,938,096 A | * | 8/1999 | Sauer et al. ............... | 224/625 |
| 6,354,044 B1 | * | 3/2002 | Lagace, Jr. ............... | 52/79.5 |
| 6,854,744 B2 | * | 2/2005 | Brandler ............... | 280/30 |
| 6,926,329 B2 | * | 8/2005 | Neumann et al. ............... | 296/24.34 |
| 6,932,377 B2 | * | 8/2005 | Bretschger et al. ............... | 280/642 |
| 2002/0149708 A1 | * | 10/2002 | Nagata et al. ............... | 348/837 |
| 2003/0132612 A1 | * | 7/2003 | Pike et al. ............... | 280/642 |
| 2006/0113342 A1 | * | 6/2006 | Hampton et al. ............... | 224/409 |

FOREIGN PATENT DOCUMENTS

WO    WO 03/047912 A2 * 12/2003    ............... 296/24.34

* cited by examiner

*Primary Examiner*—Christopher P Ellis
*Assistant Examiner*—Katy Meyer
(74) *Attorney, Agent, or Firm*—Jonathan W. Hallman; MacPherson Kwok Chen & Heid LLP

(57) ABSTRACT

An entertainment console is provided on a stroller, where the console securely holds a DVD player or other type of audio/video/media player. The console has a cavity that holds the DVD play. A release mechanism, such as a spring-biased release may be used to "pop" the DVD player out of the cavity. When the console is secured in the cavity, a hinged door can be closed over the DVD player to protect the DVD player. When the hinged door is opened, the DVD player screen can be opened as well for viewing. The DVD player screen is thus between the opened hinged door and the child. The console also has a sliding door or other protective element that slides over the DVD player controls when the DVD is in use.

7 Claims, 12 Drawing Sheets

MEDIA CONSOLE FOR STROLLER

REFERENCE TO RELATED APPLICATIONS

The present application claims priority to U.S. Provisional Application Ser. No. 60/641,045, filed Dec. 30, 2004, which is incorporated by reference in its entirety.

BACKGROUND

Strollers are very useful in today's society to allow parents to take their children with them when they leave the house. However, babies, infants, and toddlers often times have a very short attention span. So, even though the child may be initially content in the stroller, the child may quickly start crying. As a result, the parent may need to take the child out of the stroller and carry the child, as well as push the stroller. Many types of strollers have trays where the child can play with toys to keep them content and occupied. However, children may again become quickly bored with the toys. Another disadvantage with such trays is that the children may throw the toys, thereby making it very difficult to keep the toys on or near the trays for the children to play with.

Therefore, there is a need for a stroller or stroller accessory that overcomes the disadvantages discussed above.

SUMMARY

According to one aspect of the present invention, an entertainment console is provided on a stroller, where the console securely holds a DVD player or other type of audio/video/media player, such as a satellite TV receiver and player. The console has a cavity that holds the DVD player. A release mechanism, such as a spring-biased release may be used to "pop" the DVD player out of the cavity. When the console is secured in the cavity, a hinged door can be closed over the DVD player to protect the DVD player. When the hinged door is opened, the DVD player screen can be opened as well for viewing. The DVD player screen is thus between the opened hinged door and the child. The console also has a sliding door or other protective element that slides over the DVD player controls when the DVD is in use. The sliding door thus protects the controls when the child is viewing the screen and also prevents the child from playing with the controls.

As a result, the child can be entertained while in the stroller, by a cartoon, movie, educational program and the like. The console can be part of a tray to form a unitary structure that can snap into various positions on the stroller. This enables the position of the console to be adjusted based on how close the DVD or media player is to be placed to the child or user. The console can also be removable or detachable from the tray. In one embodiment, a carseat can be attached to the tray or console.

In some embodiments, the stroller may be wired for speakers for the DVD or media player so that speakers can be attached to the frame and/or canopy of the stroller. In other embodiments, the DVD screen can be mounted separately from the control panel or player, such as a flip-down screen on top of a canopy or a flip-up screen along a rail of the stroller.

These and other features and advantages of the present invention will be more readily apparent from the detailed description of the preferred embodiments set forth below taken in conjunction with the accompanying drawings.

BRIEF DESCRIPTION OF DRAWINGS

Like element numbers in different figures represent the same or similar elements.

DETAILED DESCRIPTION

Figure 1:
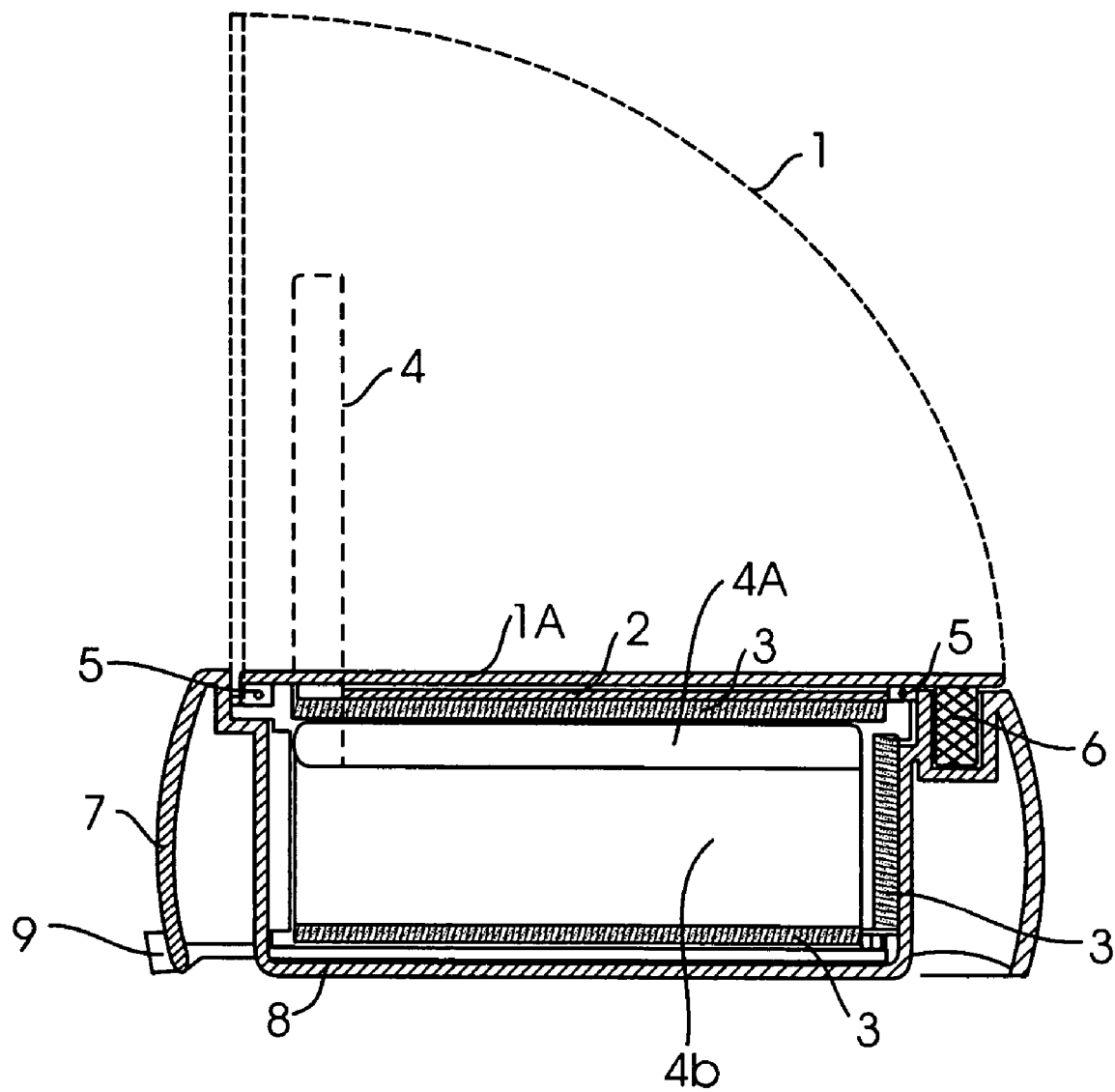
FIG. 1 is a side view of a media console according to one embodiment of the present invention.

FIG. 1 is a side view of a media console according to one embodiment of the invention. The media console has a cavity or niche in which a DVD player 4b is placed. Note that any suitable media device can be used. On the bottom and sides of the cavity is a protective padding 3 that cushions the DVD player and prevents the DVD from skipping or otherwise being interrupted during use. Protective padding 3 is removable, such as by Velcro fasteners, or any other suitable mechanism. Thus, protective padding 3 can be removed for cleaning or replacing. Protective padding 3 can be replaced with thicker or thinner padding to accommodate different sizes of DVD players.

A release mechanism or lift tray 8 is provided at the bottom of the cavity. Lift tray 8 can be underneath or above padding 3. Lift tray 8 can also be spring-loaded, with a release or ejection button 9 on the outside of the media console. In use, DVD player 4b is inserted into the cavity until it contacts lift tray 8. The DVD player can then be pushed further into cavity, forcing lift tray 8 toward the bottom of the niche until a spring-loaded mechanism locks the lift tray in place. When this happens, ejection button 9 may be pushed out into a "loaded" position. When DVD player 4b is to be removed, the user can simply push ejection button 9 to release lift tray 8. This results in the lift tray pushing the DVD player slightly out of the niche by the spring force. DVD player 4b can then be easily removed from the niche.

The solid lines of FIG. 1 show DVD player 4b in a closed or stored mode. DVD player 4b includes a DVD screen 4a, which is shown closed. A first door 1a (shown in the closed position) when not in use, encloses DVD player 4b within the niche. First door 1a is attached to the console by a hinge 5, which allows first door 1a to swing open and closed. A childproof fastener may be attached to other end of first door 1a (away from hinge 5) so that in a closed position, the child cannot open the door and access the DVD player. A corresponding or mating fastener 6 is on the console to secure first door 1a to the console.

When the DVD player is to be used, first door 1a is opened, as shown in the dotted lines 1. The opened first door is shown by the vertical representation of the door using dotted lines. The screen of the DVD player 4a is then opened, where the front of the screen faces the child sitting in the stroller. The opened screen is shown as item 4 in dotted lines. The opened first door can act as a barrier or stop for the DVD screen to prevent the DVD screen from being pushed forward, such as by the child, thereby making viewing difficult for the child. When the screen is opened, the parent can start the DVD or otherwise control the playing of the DVD by the now exposed DVD control panel.

Once the DVD is started, a second door 2 can be slid over or closed over the control panel. Second door 2 can optionally also have protective padding 3, such that when second door 2 is slid over or closed over the control panel, the padding is between the control panel and second door 2 to protect the underlying control panel. This may be important if the child attempts to hit push on second door 2. Second door 2 also prevents the child from playing with or touching the controls to the DVD player. FIG. 1 shows the embodiment where second door 2 is hinged by a hinge 5, which allows second door 2 to be opened and closed over the DVD control panel. In other embodiments, second door 2 can slide sideways along the console.

As a result, when in use, the child can watch a DVD while in the stroller without disrupting the DVD, such as by touching the control panel. When not in use, the DVD player can be closed and secured within the cavity of the console.

Figure 2:
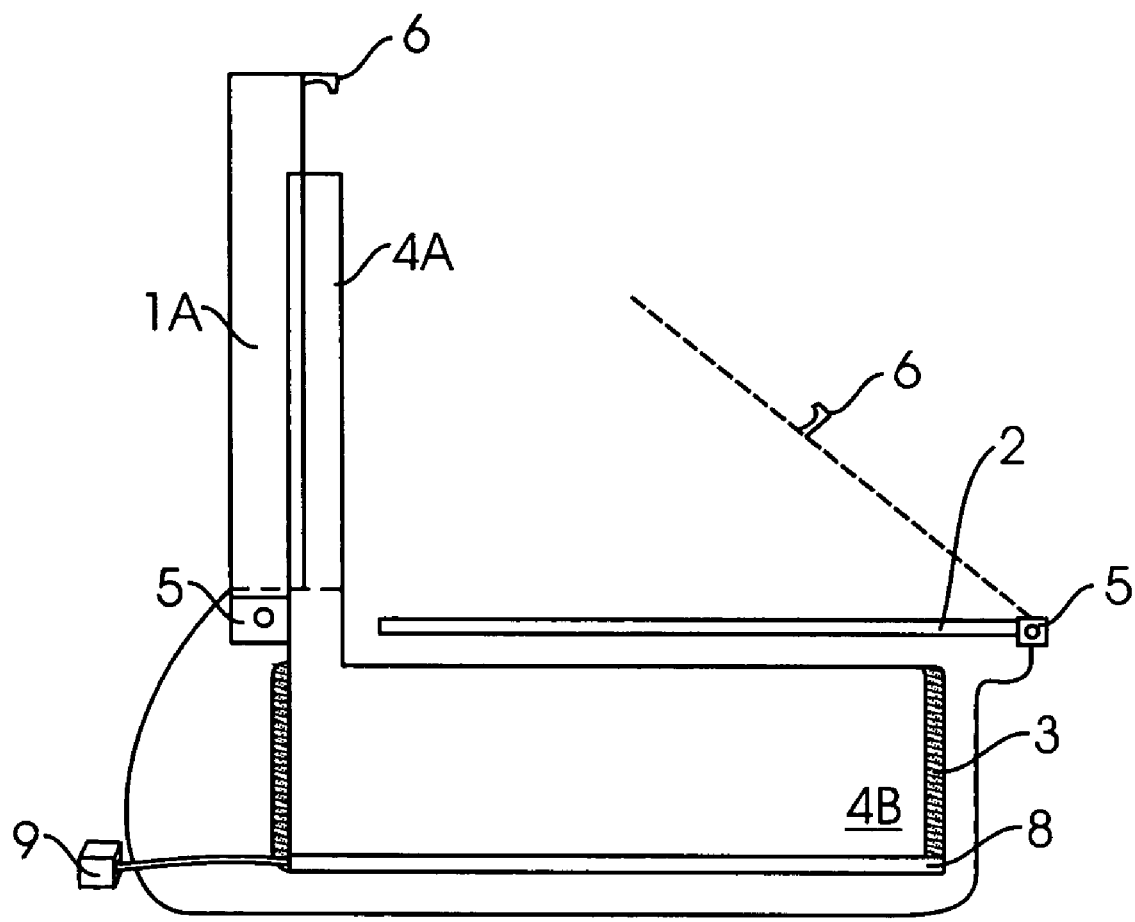
FIG. 2 is a side view of the media console of FIG. 1 in an "opened" position.

FIG. 2 is a side view of a media console similar to the one shown in FIG. 1, but with the DVD player opened. As seen, the DVD screen rests against first door 1. Since first door 1 is prevented from opening any further, the DVD screen also cannot be pushed any further back. Also shown, the ejection button is extended, meaning the lift tray has been pushed and locked by the release mechanism. FIG. 2 also shows second door 2 secured to the media console by a hinge, where second door 2 also has a fastener. The dotted lines show door 2 in a semi-opened position, while the solid lines show door 2 in a closed position covering and protecting the underlying DVD control panel.

Figure 3:
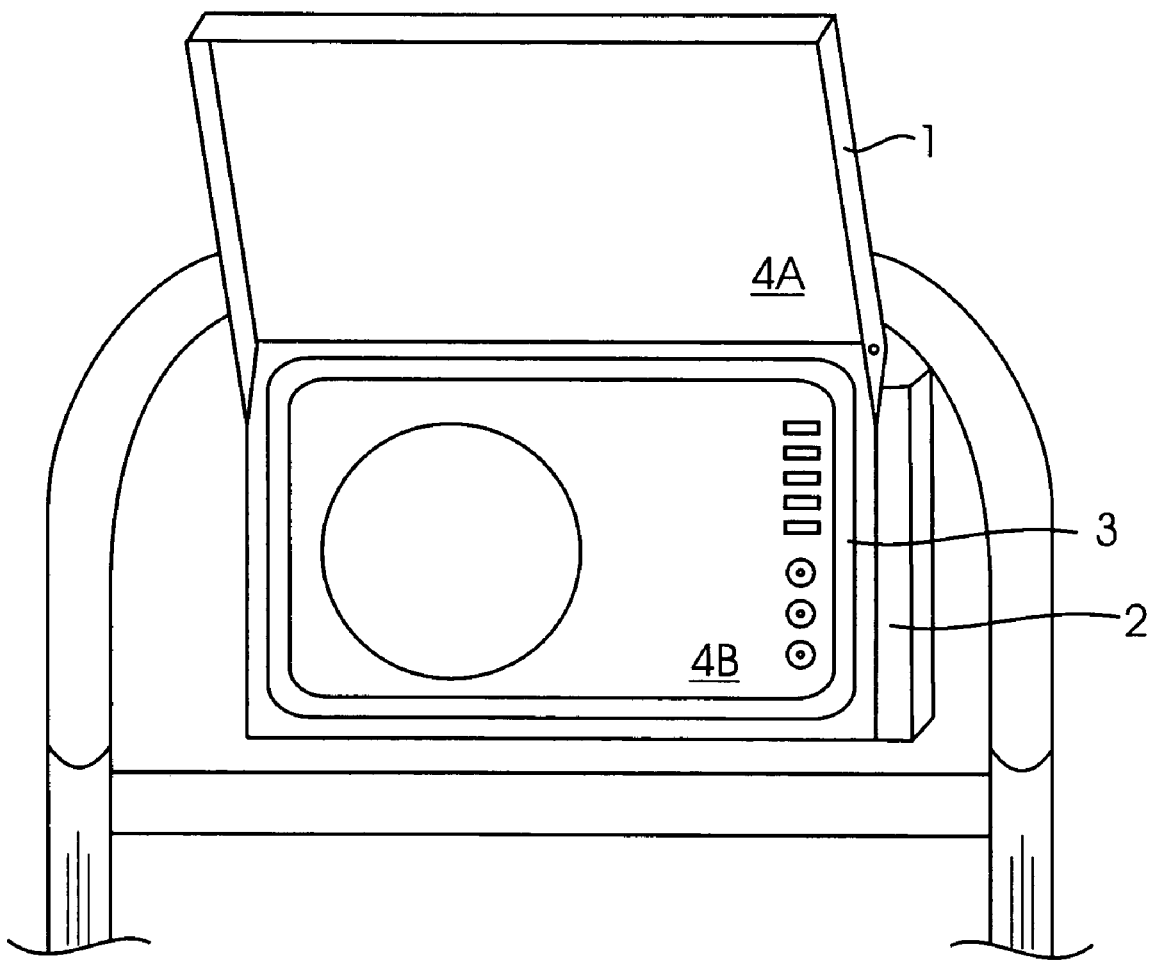
FIG. 3 is a top perspective view of the media console of FIG. 1 in an "opened" position and secured to a tray of a stroller.

FIG. 3 is a top perspective view of the media console in the opened position and secured to a tray of a stroller. The console can be secured to and removed from the tray in any number of suitable ways, such as by Velcro, bolts, screws, or matching grooves and slides. The media console may also be built or formed directly to the tray, such as by injection molding of plastic to form a unitary structure.

Figure 4:
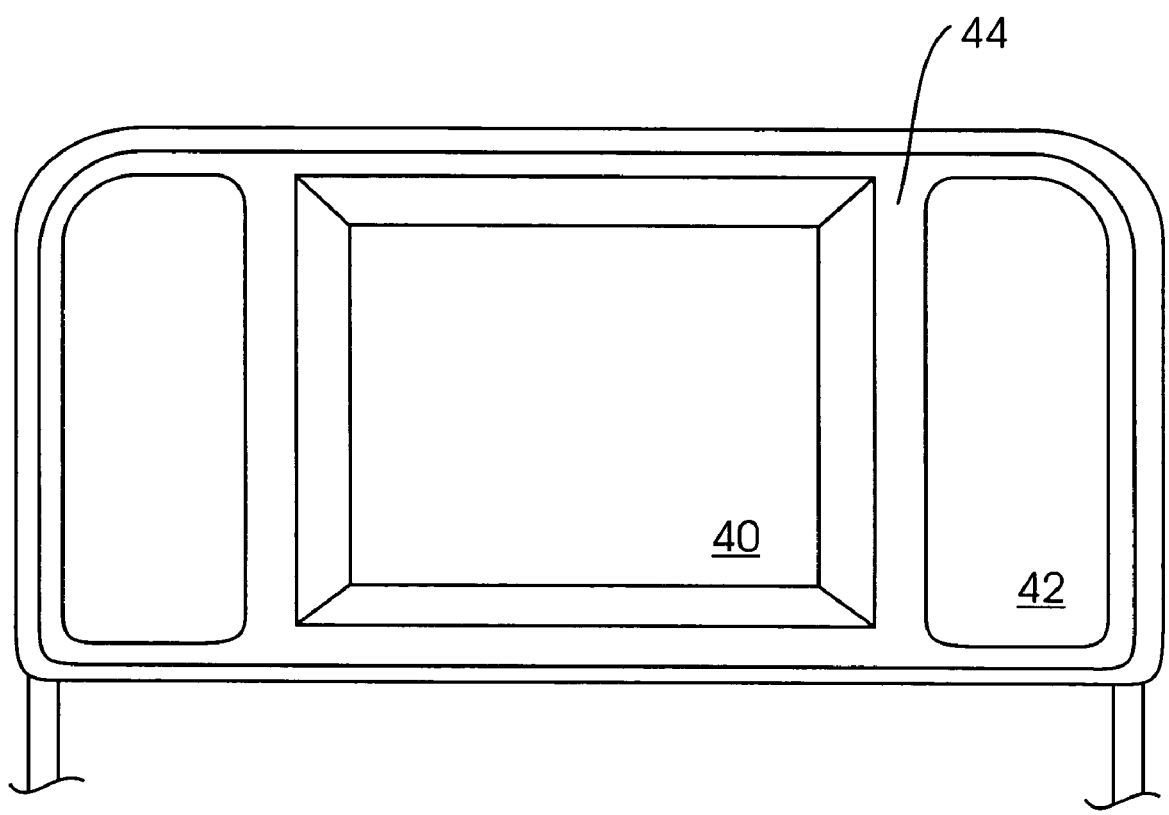
FIG. 4 is a top view of a media console according to another embodiment of the present invention.

FIG. 4 is a top view of another embodiment of a media console 44, where the media console includes a cavity or niche 40 for the DVD player and two side trays 42 on either side. The side trays can be used to hold toys or other items for the child. Dimensions shown in FIG. 4 are according to one embodiment, although different sizes may be suitable for different sized strollers or other child-carrying devices.

Figure 5:
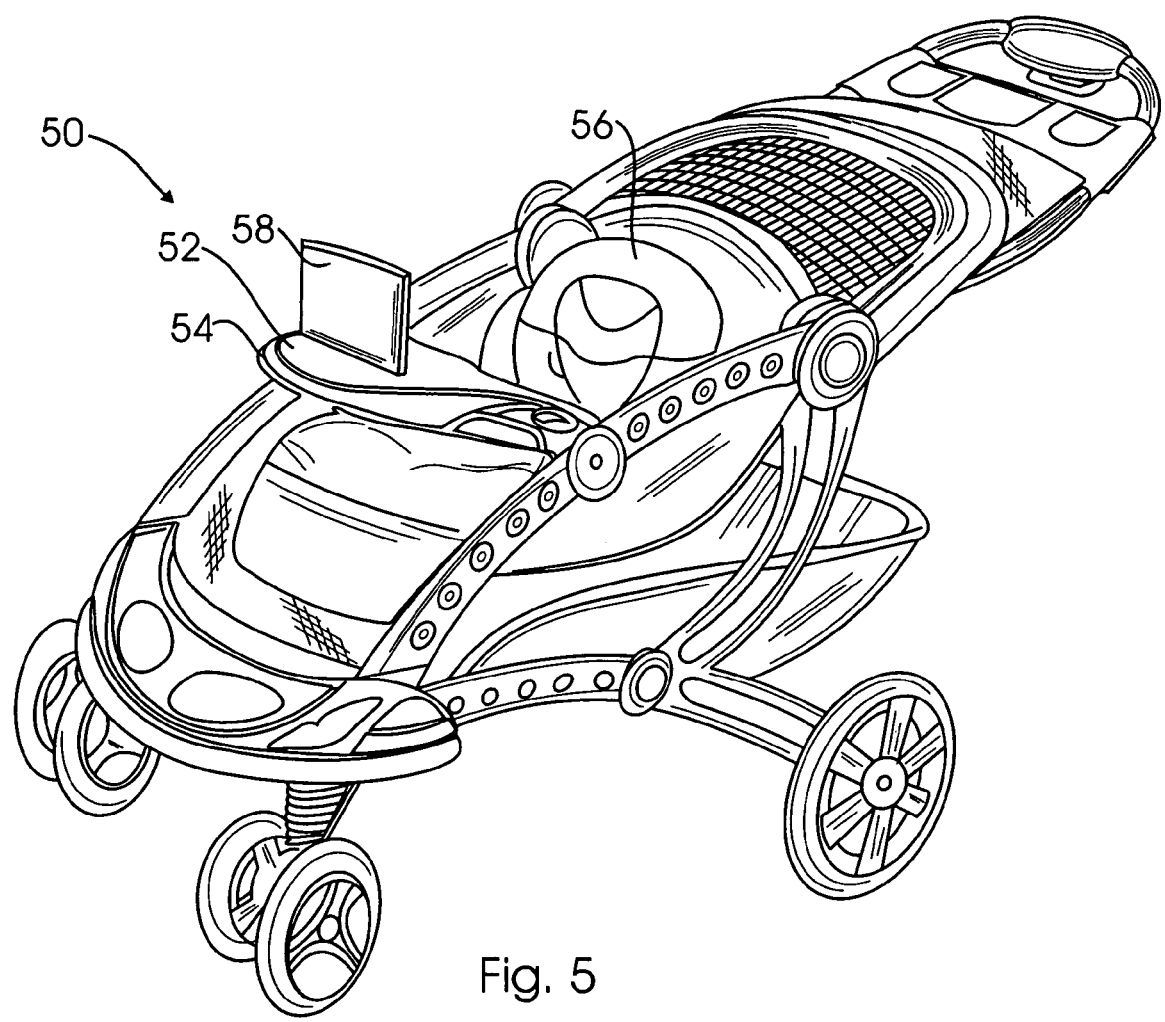
FIG. 5 shows one embodiment of a media console as part of a tray attached to a stroller.
Figure 6A:
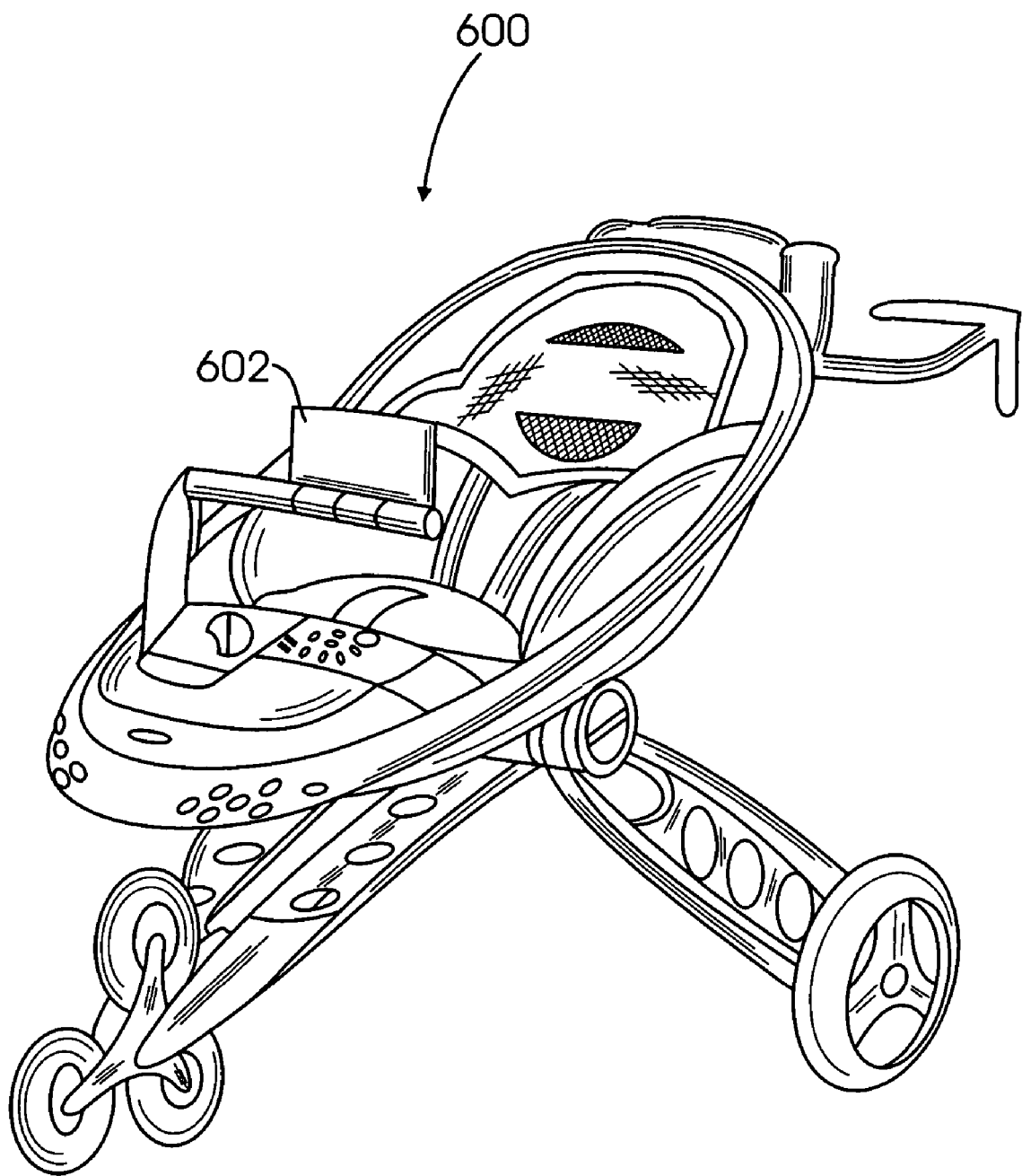
FIGS. 6A-6F show different embodiments of strollers with media players.
Figure 6B:
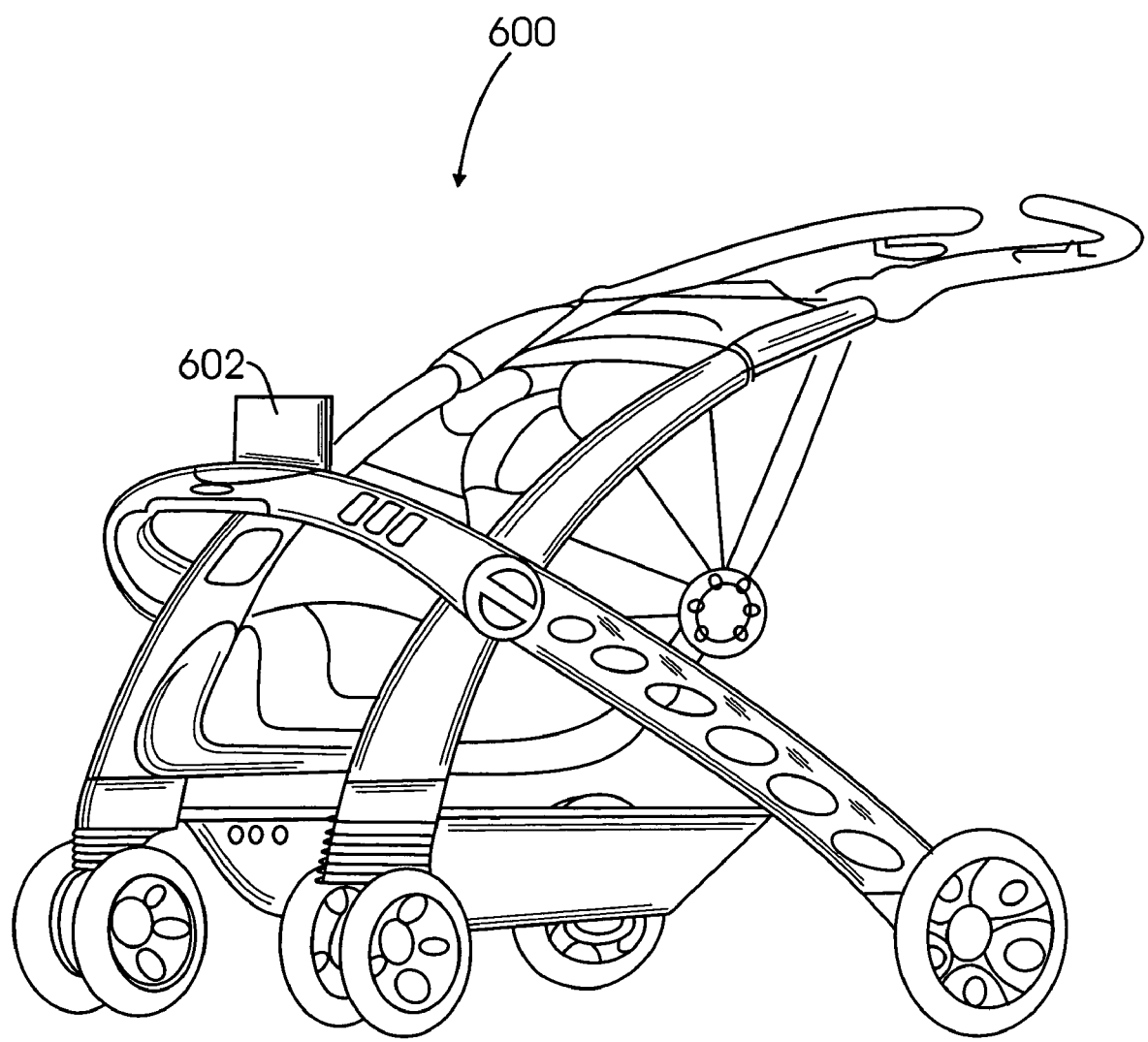
Figure 6C:
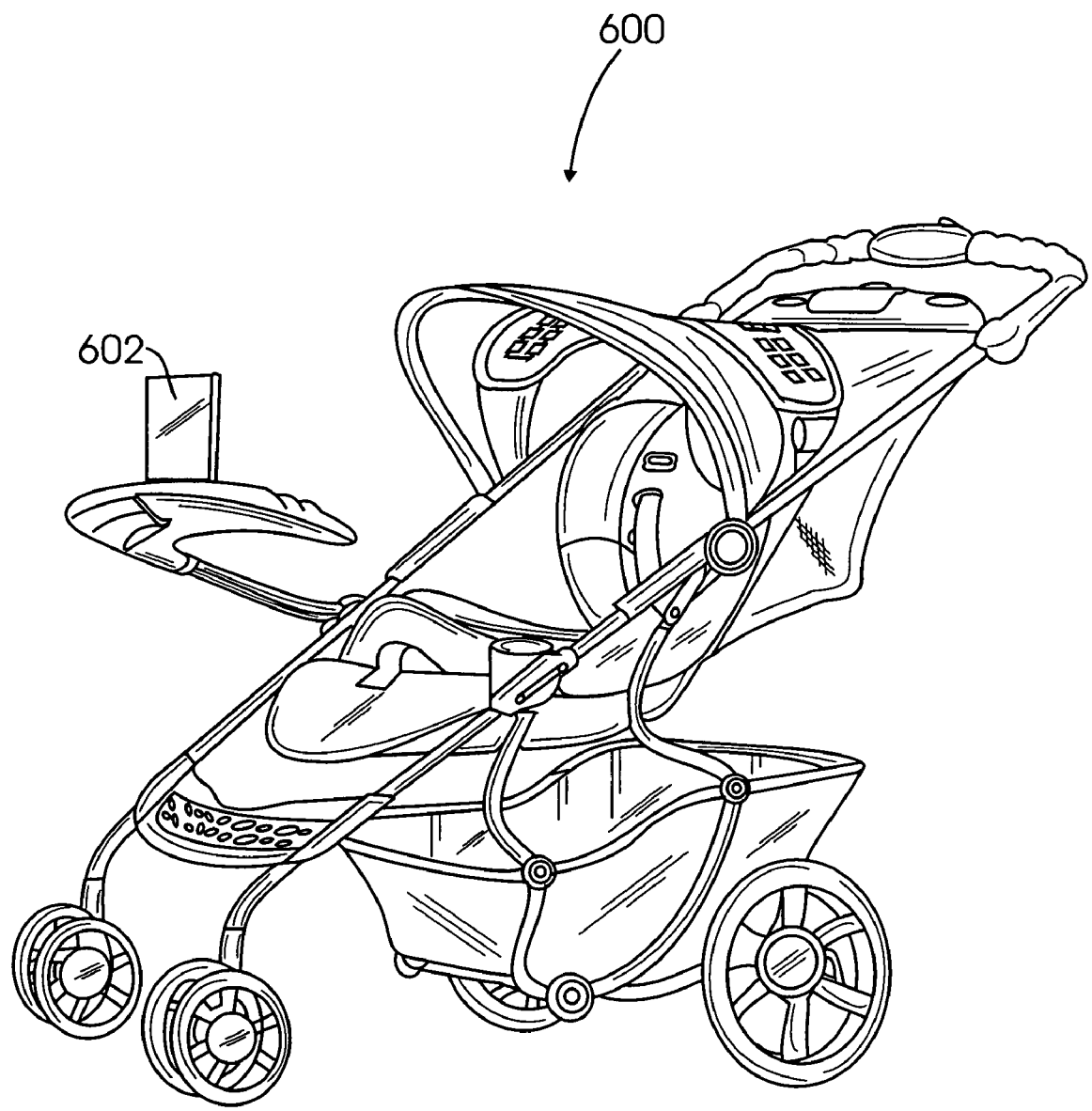
Figure 6D:
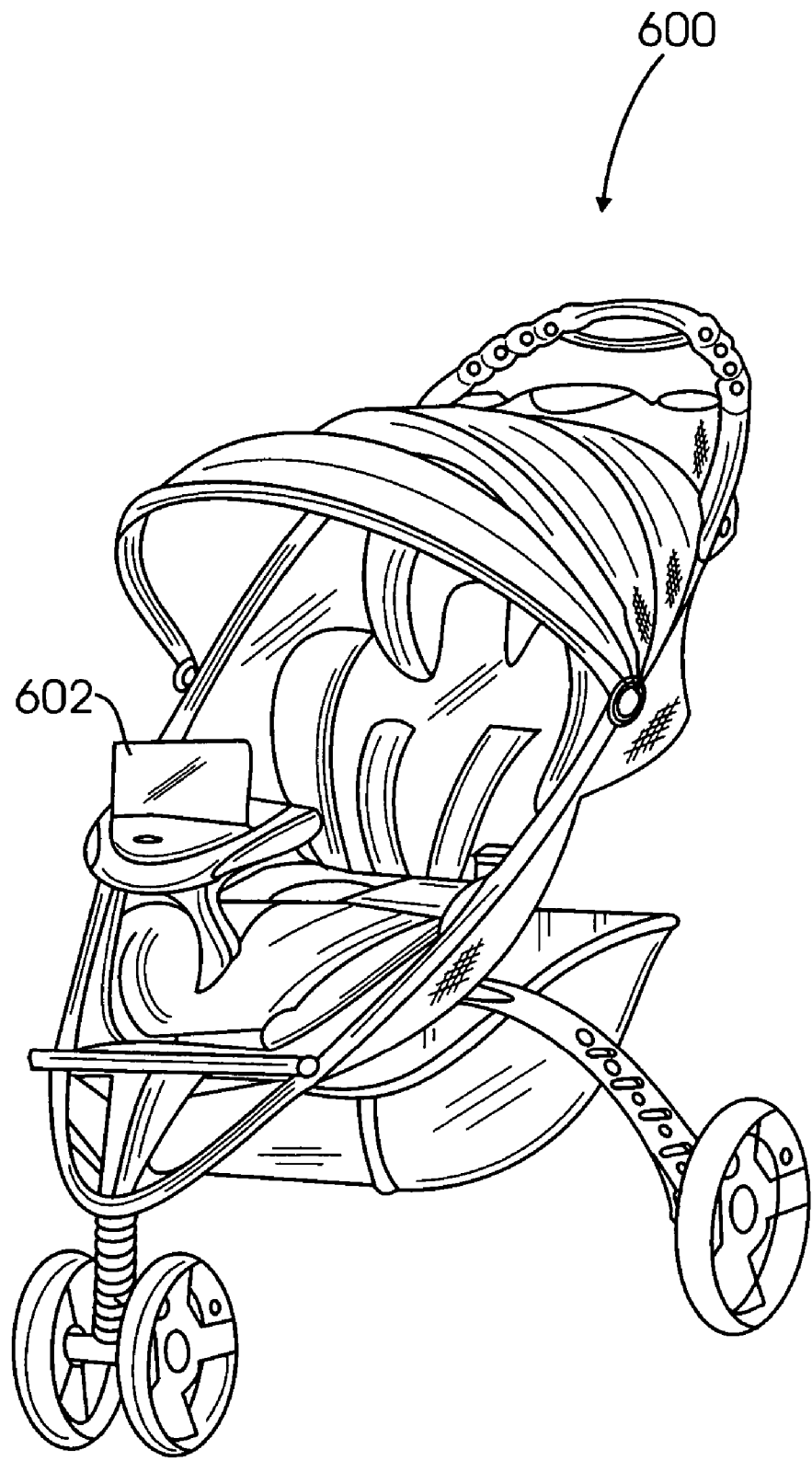
Figure 6E:
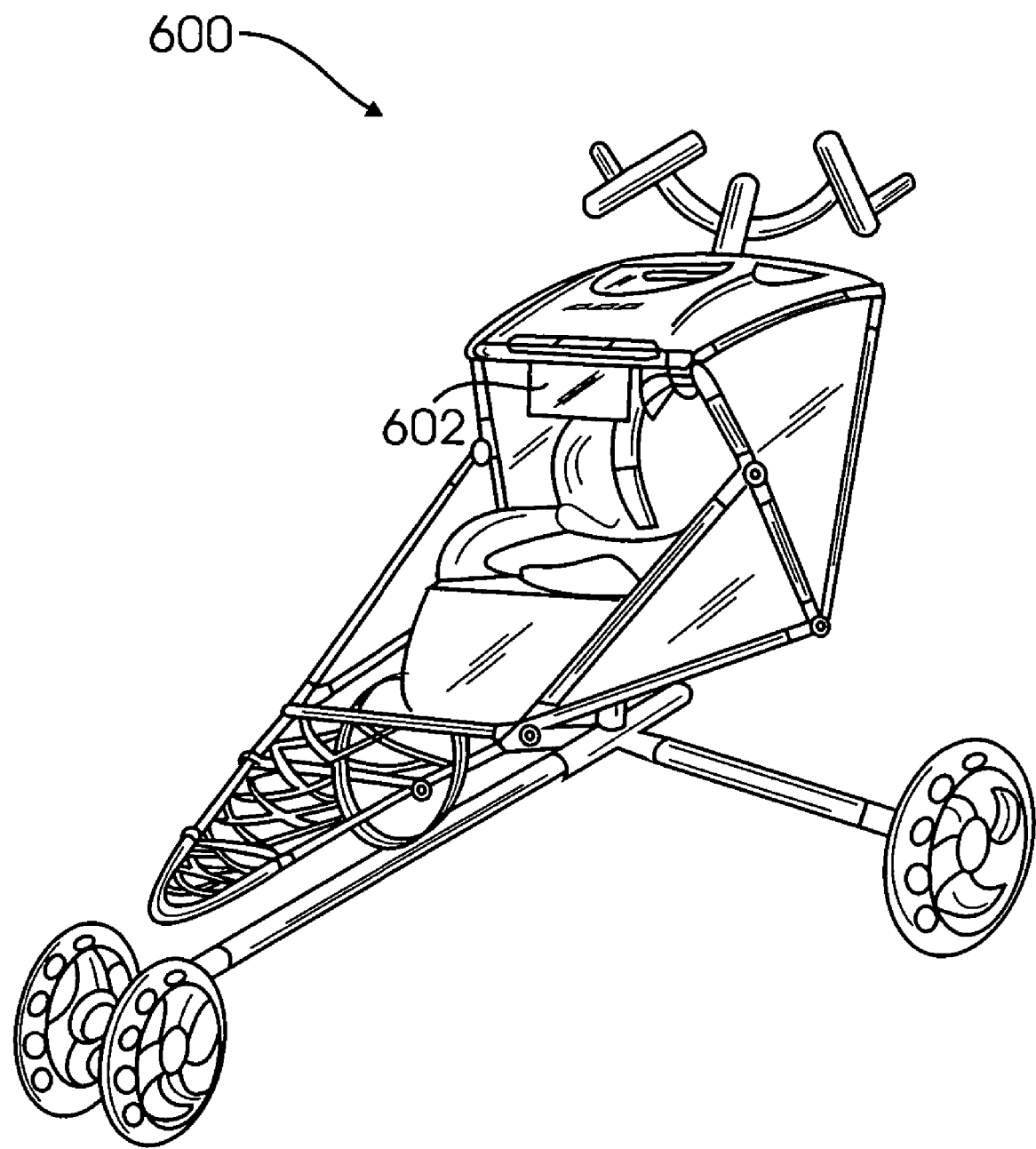
Figure 6F:
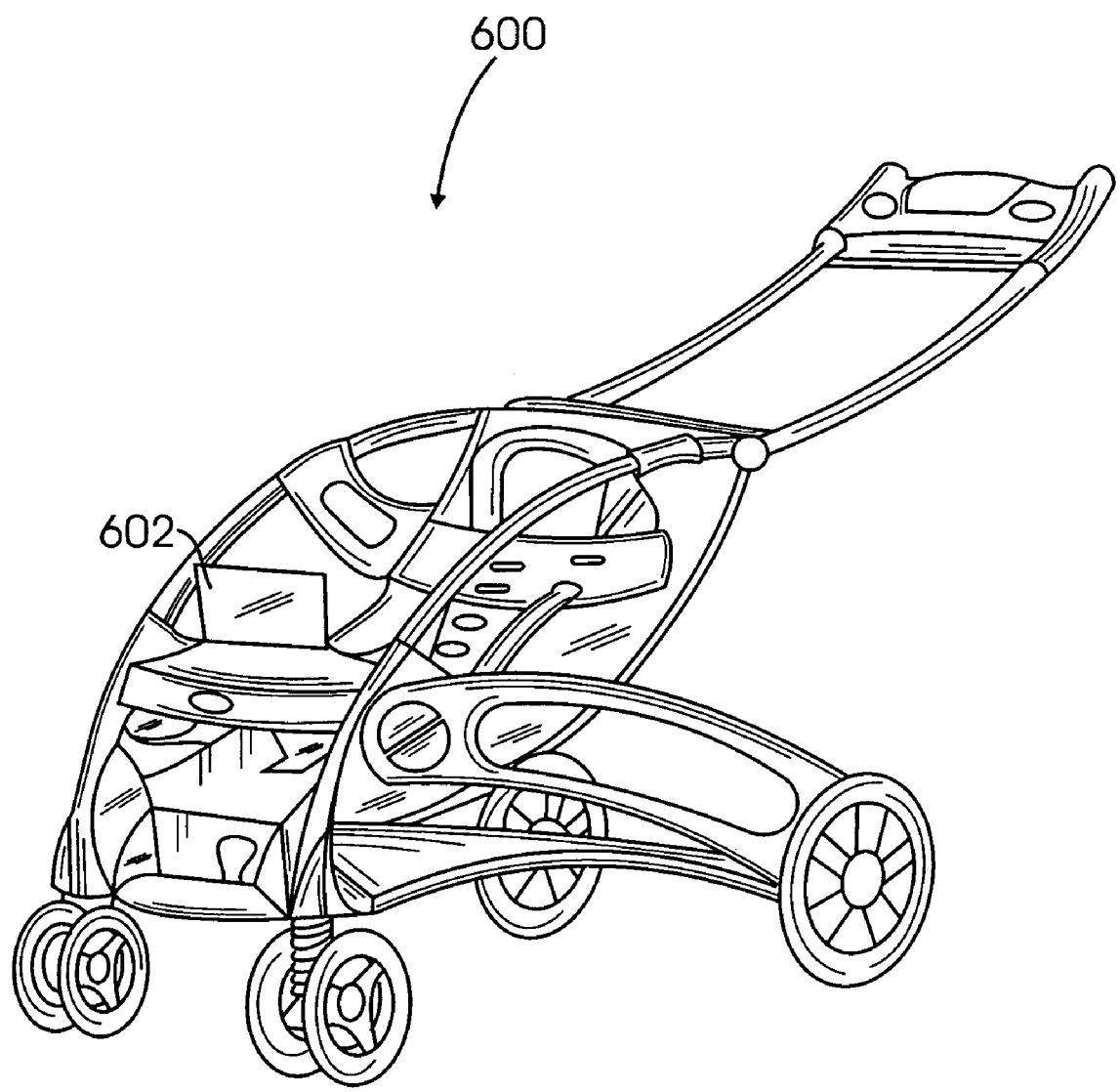

FIG. 5 shows a stroller 50, having a media console 52 attached to a tray 54. Media console 52 can be a unitary structure with tray 54, such as formed from injected plastic. Media console 52 can also be detachable from tray 54. As shown, tray 54 can be secured to stroller 50 at various positions relative to a seat 56 of stroller 50. An adjustable tray enables the parent to place a DVD or media player 58 in specific positions relative to the child. This can be beneficial if different size DVD player screens are used, as smaller screens may need to be placed closer to the child. Tray 54 can be secured to stroller 50 using any suitable method, such as protrusions from the tray matched to openings in the stroller, screws or other fasteners, etc.

FIGS. 6A-6F show different embodiments of a stroller 600 with a DVD or media player screen 602 located at on different portions of various stroller designs. Screen 602 can be attached to or separate from the player and/or controls. For example, the stroller may be wired so that various components of the media system are located at different portions of the stroller, such as the speaker inside the canopy by the child's seat and/or the controls and/or player located away from the screen, such as accessible by the parent but not by the child. The media player can also be a satellite television receiver and screen.

Figure 7:
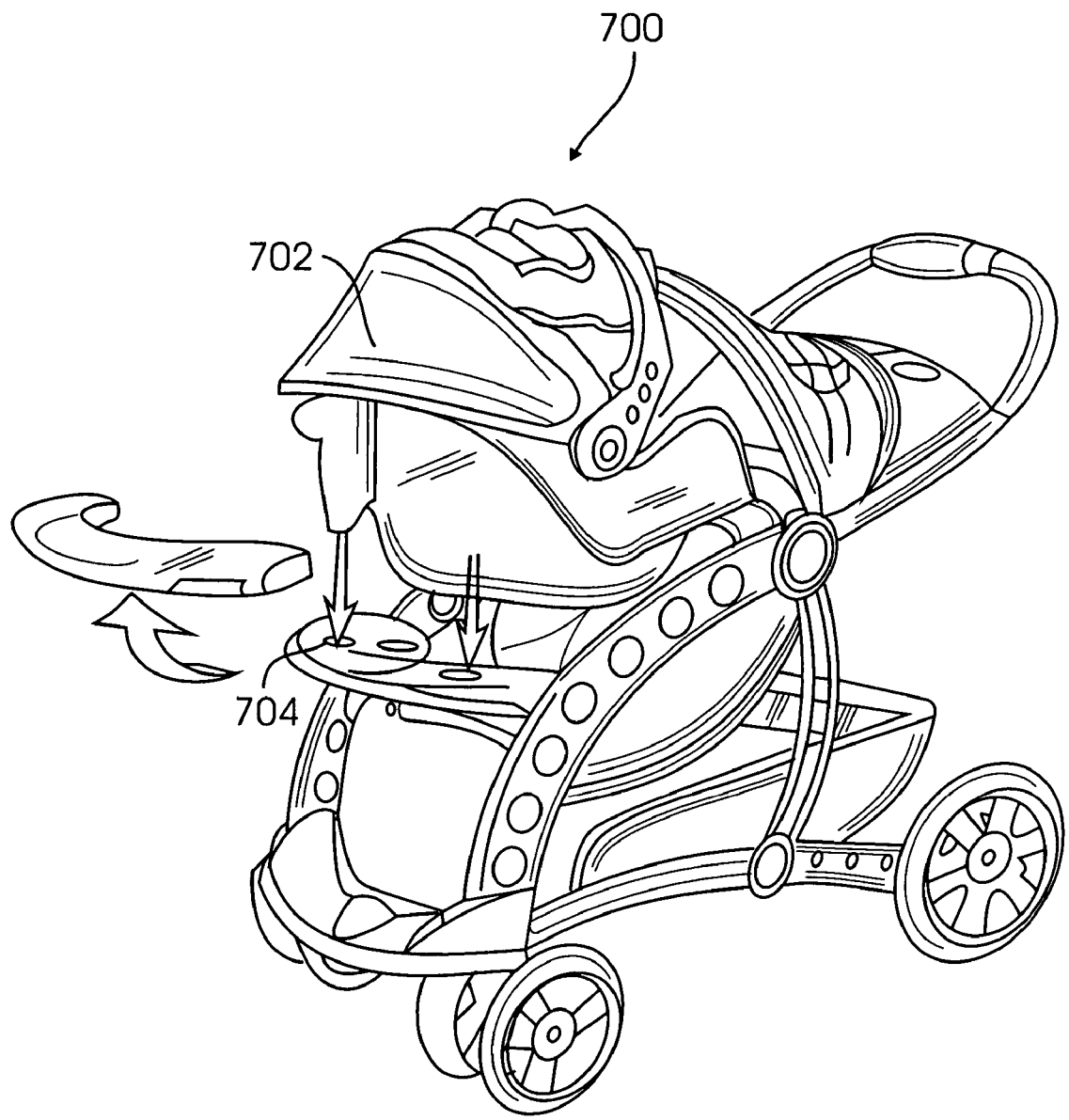
FIG. 7 shows a stroller capable of holding a car seat according to one embodiment.

FIG. 7 shows one embodiment of a stroller 700, in which a car seat 702 can be attached to a tray or console 704 of the stroller. In one embodiment, the media player or other part of the console is removed before the car seat is attached. Alternatively, the car seat (or other device) can be attached directly to the console without removing attachments on the console.

The above is just a few embodiments of the media console, and many different variations are possible. Dimensions shown throughout the drawings are also just exemplary, as dimensions can change based on the size of the stroller, the size of the tray, the size of the media player, etc. A main aspect of the invention is a console that can hold and secure a DVD player or other media player on an apparatus for carrying or holding babies, infants, toddlers, or children so that the child can watch the DVD while seated in the apparatus. Suitable types of apparatus include strollers, infant car seats, baby high chairs, and the like. The media console may also be manufactured with a media player permanently secured to the console.

Having thus described embodiments of the present invention, persons of ordinary skill in the art will recognize that changes may be made in form and detail without departing from the scope of the invention. Thus the invention is limited only by the following claims.

What is claimed:

1. A stroller comprising:
    a seat; and
    a tray located in front of the seat, wherein the tray comprises:
        a cavity configured to hold a DVD player;
        a first cover rotatably attached to a portion of the tray away from the seat, wherein the first cover is configured to close over the DVD player when the media player is not in use and to open away from the seat when the DVD player is in use; and
        a second cover attached to a portion of the tray between the first cover and the seat, wherein the second cover is configured to at least partially cover a control portion of the DVD player when the DVD player is in use.

2. The stroller of claim 1, wherein the tray is detachable from the stroller.

3. The stroller of claim 2, wherein the tray can be adjusted relative to the front of the seat.

4. The stroller of claim 2, wherein the tray further comprises a spring release mechanism in the bottom of the tray configured to push the DVD player at least partially out of the tray when the spring release mechanism is activated.

5. The stroller of claim 1, wherein the tray further comprises a portion extending from at least one side of the top of the cavity for holding objects.

6. The stroller of claim 1, further comprising at least one speaker located adjacent to the seat and away from the DVD player.

7. The stroller of claim 1, further comprising at least one speaker directly attached to the stroller.

* * * * *